United States Patent Office 3,516,840
Patented June 23, 1970

3,516,840
PRODUCTION OF CERAMIC BODIES
Walter H. Gitzen, Belleville, and George MacZura, East St. Louis, Ill., assignors to Aluminum Company of America, Pittsburgh, Pa., a corporation of Pennsylvania
No Drawing. Original application Oct. 22, 1964, Ser. No. 405,851, now Patent No. 3,432,313, dated Mar. 11, 1969. Divided and this application Oct. 31, 1968, Ser. No. 772,431
The portion of the term of the patent subsequent to Mar. 11, 1986, has been disclaimed
Int. Cl. C04b 35/10
U.S. Cl. 106—65                              2 Claims

ABSTRACT OF THE DISCLOSURE

A mixture adapted for making ceramic articles, said mixture composed of 20–80% alumina particles having a median particle size of 2.5–6 microns and 80–20% alumina particles having a median size of about 1 micron.

---

This is a division of U.S. Ser. No. 405,851 entitled "Production of Ceramic Bodies," filed Oct. 22, 1964, now U.S. Pat. No. 3,432,313, issued Mar. 11, 1969.

This invention relates to the production of molded ceramic bodies of alumina, and relates particularly to producing a special form of alumina for use in making such bodies.

It is an object of the invention to produce improved molded bodies of alumina which can be fired at relatively low temperatures to form dense, non-porous ceramic articles. It is a further object of the invention to provide an improved form of alumina, of high ceramic reactivity, for use in making ceramic bodies.

It is known to make ceramic articles, such as spark plug insulators and the like, by well-known procedures consisting of filling a mold cavity with finely divided material, such as alumina, compressing the finely divided material in the mold under high pressure, and firing the molded body at high temperature. For example, Pats. 2,091,569, 2,152,738 and 2,618,567 describe procedures of that type. When using alumina as the finely divided material, it is desirable that the alumina employed provide a dense, non-porous compressed body of low shrinkage or distortion in firing, and have high ceramic reactivity, that is, be convertible to a substantially non-porous, fully shrunk fired body at relatively low firing (maturing) temperatures. It is well known that various fluxes can be used to lower the firing temperature of such molded bodies, but such fluxes introduce impurities.

In accordance with our invention, in the production of ceramic articles of alumina by compressing finely divided alumina in a mold and firing the molded body, the alumina employed is a blend or mixture of two components, each consisting of particles of controlled size distribution. One component consists of alumina particles having a median size of 2.5–6 microns, and the second consists of particles having a median size of about 1 micron, the components being present in the proportions of 20–80% by weight of the first-mentioned component and 80–20% by weight of the second-mentioned component. Ordinarily, the best results are obtained with a mixture in which the said two components are present in the proportions of 40–60% and 60–40% respectively.

Statements herein as to median sizes of particles refer to size determinations on the basis of a size distribution of 8–10 sieve intervals ($\sqrt{2}$ series).

Alumina hydrate made by the conventional so-called "Bayer Process" consists of small particles composed of agglomerates of small crystallites. Crystalline alumina particles in the above-mentioned desired sizes can be produced conveniently by heating such alumina hydrate particles in accordance with well-known procedures to convert them to alumina composed of agglomerates of crystallites of the desired sizes, and thereafter breaking up those agglomerates into their ultimate crystallites, as by grinding the alumina particles in accordance with well-known procedures. The two components may be blended in the above-mentioned desired proportions before or after such grinding; it is usually more convenient to effect the blending before grinding.

With the alumina mixtures described herein, high density, non-porous molded bodies which undergo low shrinkage when fired can readily be produced by pressure molding. Moreover, the pressure-molded bodies can be fired satisfactorily at temperatures as low as 1700° C., or even somewhat lower, without using a flux in the mix.

The advantages of using alumina in the particle size distribution of our invention are indicated in the table below which shows properties obtained with six different mixtures of two components, one being alumina particles of a median size of about 1 micron, and the other being alumina particles of a median size of about 3 microns, each component being present in the percentages by weight shown in the table. Each of the mixtures was pressed at a pressure of 5,000 p.s.i. in a mold to produce round slugs 1 inch in diameter and ¼ inch high, after which the slugs were converted to ceramic bodies by heating them for one hour at 1700° C.

|   | Blend composition | | Density, g./ml. | | |
|---|---|---|---|---|---|
|   | Percent 1 micron (median) | Percent 3 microns (median) | Pressed | Fired | Percent shrinkage |
| 1 | 100 | 0   | 2.08 | 3.877 | 18.74 |
| 2 | 80  | 20  | 2.30 | 3.889 | 16.1  |
| 3 | 60  | 40  | 2.44 | 3.880 | 14.34 |
| 4 | 40  | 60  | 2.58 | 3.879 | 12.72 |
| 5 | 20  | 80  | 2.61 | 3.858 | 12.25 |
| 6 | 0   | 100 | 2.34 | 3.855 | 15.32 |

The above table shows that compositions 2, 3, 4 and 5 containing 20–80% of particles about 3 microns in size, the balance being about 1 micron in size, afforded significantly improved properties as compared with compositions 1 and 6.

Similar advantages were likewise obtained in a further test with compositions which were the same as Nos. 1, 2, 3, 4, 5 and 6 of the above table, except that each also contained 0.5% talc as a flux mixed with the alumina.

We claim:

1. A composition adapted for use in making pressure-molded, fired ceramic bodies comprising a mixture of two separate alumina components, one of said components consisting of alumina particles having a median size of 2.5–6 microns, and the other of said components consisting of alumina particles having a median size of about 1 micron, the said first-mentioned component constituting 20–80% by weight of the mixture, and the said second-mentioned component constituting 80–20% by weight of the mixture.

2. The composition of claim 1 wherein the mixture consists of 40–60% by weight of particles of the said first-mentioned component and 60–40% by weight of particles of the said second-mentioned component.

References Cited

UNITED STATES PATENTS

| | | | |
|---|---|---|---|
| 2,947,056 | 8/1960 | Csordas et al. | 106—65 |
| 3,093,498 | 6/1963 | Whittemore et al. | 106—65 |
| 3,264,069 | 8/1966 | Getty | 106—65 |
| 3,264,124 | 8/1966 | Lauder et al. | 106—65 |
| 3,274,008 | 9/1966 | Braunwarth et al. | 106—65 |
| 3,311,482 | 3/1967 | Klingler et al. | 106—65 |
| 3,432,313 | 3/1969 | Gitzen et al. | 106—65 |

JAMES E. POER, Primary Examiner